United States Patent
Joudon et al.

(10) Patent No.: US 11,731,221 B2
(45) Date of Patent: Aug. 22, 2023

(54) METHOD FOR SEPARATING A FIRST MECHANICAL PART FROM A SECOND MECHANICAL PART

(71) Applicant: SAFRAN AIRCRAFT ENGINES, Paris (FR)

(72) Inventors: Vincent Joudon, Moissy-Cramayel (FR); Damien Bruno Lamouche, Moissy-Cramayel (FR); Matthieu Patrick Jean Roger Perlin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/427,321

(22) PCT Filed: Feb. 4, 2020

(86) PCT No.: PCT/FR2020/050178
§ 371 (c)(1),
(2) Date: Jul. 30, 2021

(87) PCT Pub. No.: WO2020/161426
PCT Pub. Date: Aug. 13, 2020

(65) Prior Publication Data
US 2022/0143766 A1    May 12, 2022

(30) Foreign Application Priority Data
Feb. 4, 2019  (FR) ......................... 1901069

(51) Int. Cl.
B23P 19/04  (2006.01)
B23P 6/00  (2006.01)
(Continued)

(52) U.S. Cl.
CPC .............. *B23P 19/04* (2013.01); *B23P 6/002* (2013.01); *B24C 1/10* (2013.01); *B24C 5/005* (2013.01);
(Continued)

(58) Field of Classification Search
CPC .......... B23P 19/04; B23P 6/002; B23P 15/04; B24C 1/10; B24C 5/005; B26F 3/06;
(Continued)

(56) References Cited

U.S. PATENT DOCUMENTS

| 6,343,495 B1 * | 2/2002 | Cheppe | ..................... B23P 9/04 |
|---|---|---|---|
| | | | 72/710 |
| 6,878,041 B2 * | 4/2005 | Esser | ..................... B23P 6/002 |
| | | | 451/39 |

(Continued)

FOREIGN PATENT DOCUMENTS

| EP | 0854208 A1 | 7/1998 |
|---|---|---|
| FR | 2787366 A1 | 6/2000 |

(Continued)

OTHER PUBLICATIONS

International Search Report dated May 13, 2020, issued in corresponding International Application No. PCT/FR2020/050178, filed Feb. 4, 2020, 3 pages.

(Continued)

*Primary Examiner* — Ryan J. Walters
(74) *Attorney, Agent, or Firm* — Christensen O'Connor Johnson Kindness PLLC

(57) ABSTRACT

A method for separating a first mechanical part from a second mechanical part is described, wherein the second mechanical part is bonded to the first mechanical part by an adhesive film along a connecting area, the first mechanical part having a first specific thermal conductivity and the second mechanical part having a second thermal conductiv- (Continued)

ity that is higher than the first thermal conductivity. The method includes at least one cooling step during which the second mechanical part is cooled to a negative temperature and at least one stressing step during which the second mechanical part is subjected to mechanical stress in order to cause the adhesive film to break.

13 Claims, 2 Drawing Sheets

(51) Int. Cl.
  *B24C 1/10* (2006.01)
  *B24C 5/00* (2006.01)
  *B26F 3/06* (2006.01)
  *B64C 11/20* (2006.01)
  *F01D 5/00* (2006.01)
  *F01D 5/28* (2006.01)

(52) U.S. Cl.
  CPC .............. *B26F 3/06* (2013.01); *B64C 11/205* (2013.01); *F01D 5/005* (2013.01); *F01D 5/288* (2013.01); *F05D 2230/10* (2013.01)

(58) Field of Classification Search
  CPC .......... F01D 5/005; F01D 5/147; F01D 5/288; F05D 2230/10; B64C 11/26; B64C 2027/4736; B64C 27/473; B64C 11/205; B64F 5/40; C09J 5/00; C09J 2301/502; B32B 43/006; B32B 2603/00; F04D 29/324; Y02P 70/50
  See application file for complete search history.

(56) References Cited

U.S. PATENT DOCUMENTS

| | | | |
|---|---|---|---|
| 8,894,809 B2 | 11/2014 | Varin | |
| 2003/0009870 A1 | 1/2003 | Boschet et al. | |
| 2010/0154992 A1* | 6/2010 | Feinstein | G02F 1/1309 156/752 |
| 2014/0030108 A1 | 1/2014 | Chichery | |
| 2017/0252896 A1 | 9/2017 | Gasher et al. | |
| 2019/0061073 A1* | 2/2019 | Bogue | B23P 11/025 |

FOREIGN PATENT DOCUMENTS

| | | |
|---|---|---|
| FR | 2970197 A1 | 7/2012 |
| FR | 2992243 A1 | 12/2013 |
| FR | 3025735 A1 | 3/2016 |
| FR | 3043685 A1 | 5/2017 |
| FR | 3056605 A1 | 3/2018 |

OTHER PUBLICATIONS

Written Opinion of the International Searching Authority dated May 13, 2020, issued in corresponding International Application No. PCT/FR2020/050178, filed Feb. 4, 2020, 6 pages.

Written Opinion of the International Searching Authority dated May 13, 2020, issued in corresponding International Application No. PCT/FR2020/050178, filed Feb. 4, 2020, 5 pages.

Preliminary International Report on Patentability dated Aug. 10, 2021, issued in corresponding International Application No. PCT/FR2020/050178, filed Feb. 4, 2020, 1 page.

* cited by examiner

METHOD FOR SEPARATING A FIRST MECHANICAL PART FROM A SECOND MECHANICAL PART

TECHNICAL FIELD

Embodiments of the disclosure relate to a method for separating a first mechanical part from a second mechanical part. The disclosure applies in particular to a method for separating a metal reinforcement from the leading edge of a turbomachine vane made of composite material.

BACKGROUND

Fan-equipped double-flow turbomachines are equipped with vanes that can be carried out mainly of organic matrix composite material. These vanes are usually equipped with metal reinforcements made of titanium alloys which are bonded to the vanes, for example on the leading edges of the vanes.

In service, the metal reinforcement of one or more vanes can be damaged by various impacts, for example when a foreign object such as a bird or a debris is ingested by the fan. However, in this case, the corresponding vane is not necessarily damaged, so that it may be worthwhile to replace only the metal reinforcement and to keep the composite vane, since the latter, because of its manufacture of composite material, has a high economic value.

The problem of the disclosure therefore lies in the development of a method for separating the metal reinforcement from the vane made of composite material without damaging said vane.

Various techniques known from the prior art have been used up to now to separate the metal reinforcement from the vane:

Document FR-2.970.197-A1 discloses a method for inductively separating a first mechanical part from a second magnetic mechanical part bonded to the first part by an adhesive film. In this method, the magnetic properties of the second magnetic mechanical part are used by producing a magnetic field in the bonding area so that eddy currents are inductively generated in the second magnetic mechanical part, thereby heating it and softening the adhesive film bonding the two parts so that the mechanical parts can be separated.

The disadvantage of this method, applied to a vane reinforcement, is that the thickness of the vane is not uniform. In some embodiments, the reinforcement is of high thickness at the level of the leading edge of the vane and is of reduced thickness in extension areas which extend inwardly of the vane from this leading edge and which are bonded to the surface of the vane by the adhesive film.

The magnetic field used to reach a sufficient temperature rise of the reinforcement at the level of the high thickness area of the reinforcement may cause an overheating in the low thickness areas of the reinforcement. This overheating can be transmitted to the composite material of the vane, with the risk of degrading it.

The document FR-3.056.605-AT discloses a separating method by dissolution. According to this method, a part of a vane comprising a reinforcement of a leading edge made of a titanium alloy is immersed in a chemical treatment enclosure supplied by a closed circuit in which a chemical treatment composition circulates and a closed circuit in which a rinsing composition circulates. The chemical treatment composition is circulated to dissolve the titanium alloy, and then the vane is rinsed.

This solution has the disadvantage of requiring relatively bulky and complex equipment, and of presenting a high processing time, linked to the dissolution of the titanium reinforcement. Moreover, the material of the latter being dissolved, it cannot be recycled.

Document US-2014/030108-A1 describes a method for separating by heating and mechanically stressing an assembly comprising an adhesive film loaded with shape memory materials, the heating being carried out at a temperature higher than the martensitic transformation temperature of said materials. This very specific adhesive can only be used in a restrictive way.

The documents FR-3.025.735A1 and FR-2.992.243 describe a method for separating by cooling and mechanically stressing assemblies in which the entire assembly is cooled. This configuration does not allow to take advantage of the differences in thermal conductivity between materials.

SUMMARY

The disclosure remedies this disadvantage by proposing a method for separating a first mechanical part from a second mechanical part, allowing to break the connection between the adhesive film and the second mechanical part, which has the higher thermal conductivity.

More particularly, the disclosure proposes a method for breaking the interface between the adhesive and the material of the second mechanical part, by applying, on the one hand, a thermal stress to the second mechanical part and, on the other hand, a mechanical stress to this second part.

This second part, which has a higher thermal conductivity than the first part, is thus adapted to transmit the thermal stress quickly due to its high thermal conductivity, which, combined with the mechanical stress, allows to break the adhesive film.

For this purpose, the disclosure proposes a method for separating a first mechanical part from a second mechanical part, wherein the second mechanical part is bonded to the first mechanical part by an adhesive film along a connecting area, the first mechanical part having a first specific thermal conductivity and the second mechanical part having a second thermal conductivity that is higher than the first thermal conductivity, characterized in that it comprises at least one cooling step during which only the second mechanical part is cooled to a negative temperature and at least one stressing step during which the second mechanical part is subjected to a mechanical stress in order to cause the adhesive film to break.

According to other characteristics of the method:
the cooling and stressing steps are simultaneous,
during the stressing step, the second part is subjected to a compressive stress in a direction substantially perpendicular to a surface of the adhesive film,
the compressive stress is carried out by a vibrating means or by a projectile projection means,
the vibrating means is an ultrasonic hammering means and the projectile projection means is a blasting means,
the cooling step is carried out by projecting liquid nitrogen onto the second part.
the first part is a vane made of composite material, the second part is a metal reinforcement bonded to a leading edge of said vane, and the method comprises two simultaneous steps comprising a step for cooling the metal reinforcement by projecting liquid nitrogen and a stressing step during which the reinforcement is subjected to a mechanical stress by ultrasonic hammering in a direction substantially perpendicular to a surface of the adhesive film, the method is implemented by means of a tooling allowing to carry out simultaneously the two steps of cooling and stressing in an area of coverage of the leading edge of the vane by the tooling of length less than a length of the leading edge of the vane, and said tooling is moved along the entire length of the leading edge of the vane, the liquid nitrogen is projected at a temperature of substantially −200° C. and the ultrasonic hammering is performed at a frequency of between 10 kHz and 40 kHz.

The disclosure also relates to a tooling for separating a first mechanical part from a second mechanical part according to the method described above, characterized in that it comprises an assembly which can move in translation along a free surface of the second mechanical part, said assembly comprising:

a stressing unit comprising successively:
  a generator, converting a source of electrical power for supplying said generator into a sinusoidal electrical signal,
  a converter, converting the sinusoidal electrical signal into sinusoidal vibratory waves,
  an amplifier, amplifying the vibratory waves,
  a sonotrode, adapted to transmit the vibratory waves,
  at least one transmission finger, arranged in contact with the second part, and adapted to receive the vibratory waves of the sonotrode and to mechanically transmit them to the second part,
a cooling unit comprising, successively:
  a pressurized nitrogen storage tank,
  an expander adapted to receive the nitrogen from the tank and to deliver it under a determined pressure,
  a conduit, supplied with pressurized nitrogen by the expander, and extending in the vicinity of the second part,
  a nozzle, arranged at the end of the conduit, configured to spray the liquid nitrogen onto the surface of the second part.

DESCRIPTION OF THE DRAWINGS

The disclosure will be better understood and other details, characteristics and advantages of the present disclosure will become clearer from the following description made by way of non-limiting example and with reference to the attached drawings, in which.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
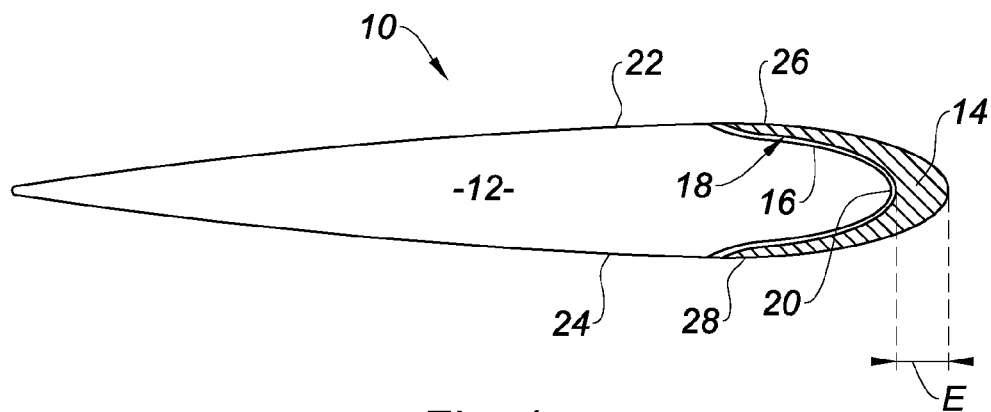
FIG. 1 is a schematic cross-sectional view of a turbomachine vane.

FIG. 1 shows a turbomachine vane assembly 10. In a known manner, the vane assembly 10 consists of two parts 12 and 14 bonded by an adhesive film 16, the thickness of which has been exaggerated for the purposes of understanding FIG. 1. The adhesive film 16 thus defines a connecting area 18 between the two parts.

The first mechanical part 12 is of a specific thermal conductivity and the second part 14 is of a higher thermal conductivity 14 than the first part 12.

In the case of a turbomachine vane assembly 10, the first part is a vane 12 made of composite material, for example an organic matrix composite material, and the second part is a metal reinforcement 14 made of a titanium alloy bonded to a leading edge 20 of the vane 12.

Figure 2:
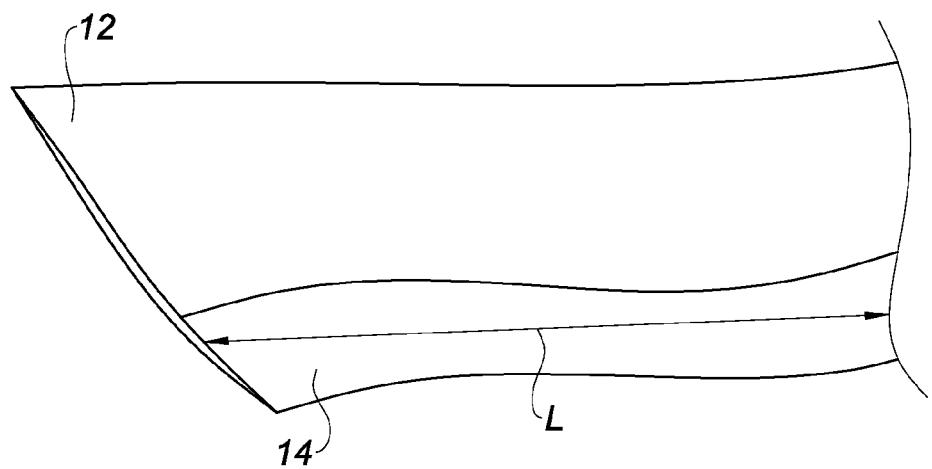
FIG. 2 is a schematic perspective view of the vane of FIG. 1.

As illustrated in FIG. 2, the reinforcement 14 extends along a length L along the leading edge 20 of the vane 12.

Conventionally, the separating methods known in the prior art consist either in softening the adhesive film 16 by inductive heating of the reinforcement 14, or in performing a chemical dissolution operation of the reinforcement 14.

As can be seen in FIG. 1, the thickness of the reinforcement 14 is not uniform. The reinforcement 14 caps the vane 12 and has a thickness E which is maximum at the level of the leading edge 20 and decreases to minimum values in areas 26 and 28 where the reinforcement joins extrados areas 22 and intrados areas 24 of the vane 12.

Consequently, an inductive heating of the reinforcement 14 to cause sufficient softening of the adhesive film 16 at the level of the leading edge has the disadvantage of causing an excessive heating of the areas 26 and 28, with a consequent risk of degradation of the composite material of the vane 12 in the vicinity of these areas. This technical solution is therefore inappropriate.

A chemical dissolution operation of the reinforcement 14 does not risk damaging the vane 12, but has the disadvantage of using long and costly means.

The disclosure remedies these disadvantages by proposing a method comprising at least one cooling step during which the reinforcement 14 is cooled to a negative temperature and at least one stressing step during which the reinforcement 14 is subjected to a mechanical stress to cause the adhesive film 16 to break.

The cooling of the metal reinforcement 14, which has a high thermal conductivity, allows the adhesive film 16 in contact with the metal of the metal reinforcement 14 to be cooled in order to change its ductile mechanical behavior into a brittle mechanical behavior, which causes a decrease in its toughness. This allows to reduce the mechanical energy input required to break the adhesive film 16, which allows to considerably reduce the risk of degradation of the vane 12 when, during the stressing step, the reinforcement 14 is subjected to a mechanical stress.

The change in the mechanical behavior of the adhesive film 16 depends on the adhesive used. Conventionally, the vanes 12 and reinforcements 14 are assembled using epoxy adhesives which become brittle when very negative temperatures are reached because the mobility of the macromolecular chains of the adhesive film 16 is then reduced. The cooling step of the method of the disclosure allows the adhesive film to become more brittle.

In the preferred embodiment of the disclosure, the cooling and stressing steps are simultaneous. This configuration does not limit the disclosure, and the stressing operation could be carried out after the reinforcement 14 has cooled, as long as the latter does not rise sufficiently in temperature for the adhesive film 16 to recover its ductile behavior.

Figure 3:
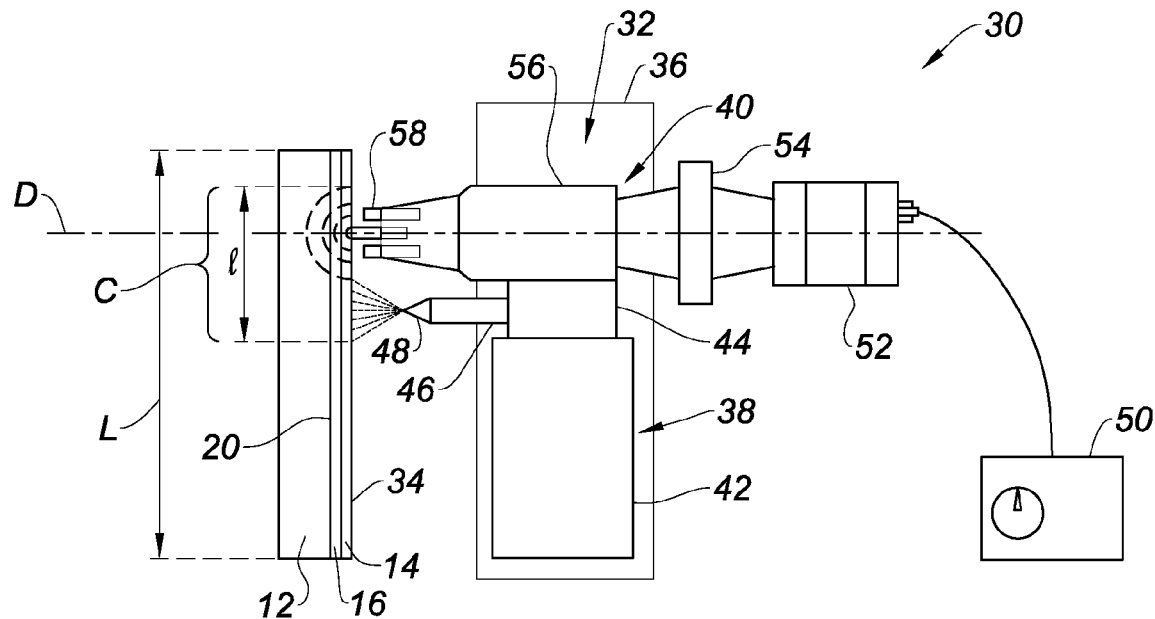
FIG. 3 is a top view of a tooling according to the disclosure during the implementation of the method according to the disclosure.
Figure 4:
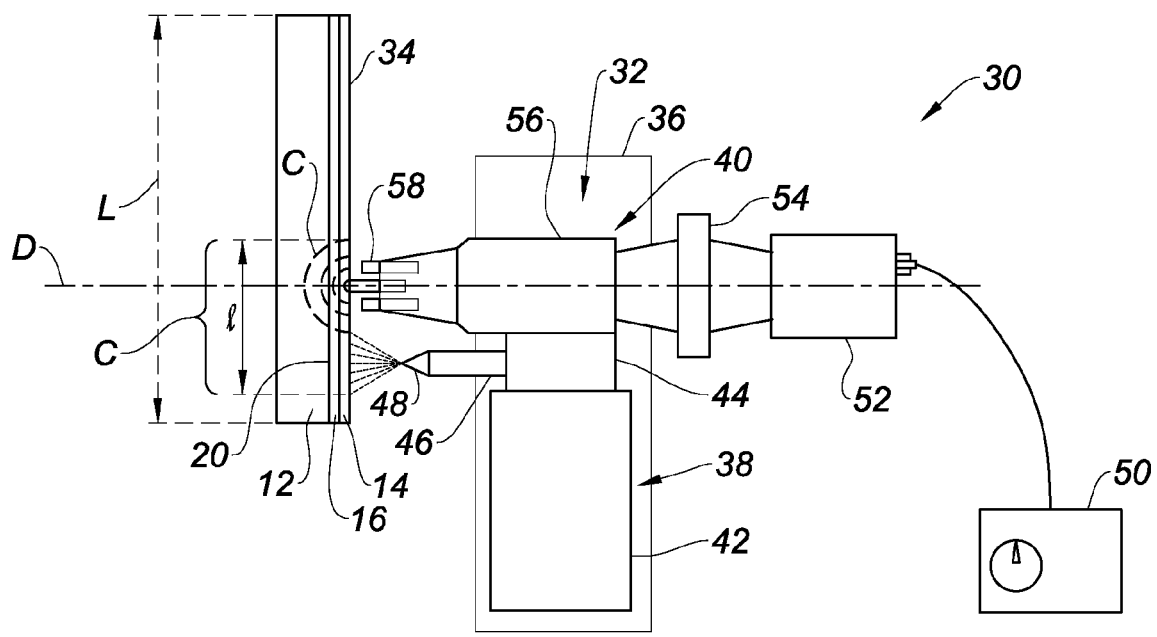
FIG. 4 is another top view of a tooling according to the disclosure during the implementation of the method according to the disclosure.

A tooling 30 allowing to carry out these steps is shown in FIGS. 3 and 4.

The tooling 30 comprises an assembly 32 translatable along a length L along a free surface 32 of the reinforcement 14. The assembly 32 can be moved manually. However, within the scope of an industrialization of the method, the assembly 32 is mounted on a carriage 36 mobile in translation.

The assembly 32 preferably comprises, from upstream to downstream according to the direction of the movement of the assembly 30, indicated by the arrow in FIG. 3, a cooling unit 38 intended to conduct the cooling step and a stressing unit 40 intended to conduct the stressing step.

Thus, any area of the reinforcement 14 cooled by the cooling unit 38 is immediately subjected to the stress of the stressing unit 40 when the assembly 30 is moved.

The cooling unit 38 comprises a tank 42 of pressurized cooling fluid and an expander 44 adapted to receive the fluid from the tank 42 and to deliver it under a determined pressure. This expander is connected to a conduit 46, supplied with pressurized cooling fluid, which extends in the vicinity of the reinforcement 14. The end of the conduit 46 comprises a nozzle 48 that is configured to spray the cooling fluid onto the surface of the reinforcement 14.

In the preferred embodiment of the disclosure, the cooling step is made by projecting a liquid nitrogen-based cooling fluid onto the reinforcement 14.

The nozzle 48 is thus configured to spray the surface of the reinforcement 14 with a liquid nitrogen mist.

The liquid nitrogen is projected at a temperature of −200° C. The adhesive film 16 is cooled by thermal conduction through the reinforcement 14. The application time of the nitrogen therefore depends on the thickness and the nature of the metal reinforcement 14, as well as the desired temperature in the adhesive film 16 to cause its rupture.

A major advantage of this method lies in the differences in thermal conductivity of the reinforcement 14 and the adhesive film 16.

On the one hand, the reinforcement 14 conducts the heat quickly and allows the adhesive film 16 to cool down quickly. However, the adhesive made of polymeric material used in the adhesive film 16 is not very heat-conducting, thus thermally insulating the vane 12. As an example, a few seconds of nitrogen application is sufficient to treat metal reinforcement thicknesses of less than 1 mm.

Several types of mechanical stress can be considered during the stressing step, for example, stresses perpendicular to a chord of the vane. However, preferably, as illustrated in FIGS. 3 and 4, the second part, i.e. the reinforcement 14 is subjected to a compressive stress in a direction D substantially perpendicular to a surface of the adhesive film 16.

This compressive stress is a mechanical stress corresponding to an impact on the surface of the metal reinforcement 14. This compression wave has the advantage of being transformed into a traction wave at the interface between the reinforcement 14 and the adhesive film 16 due to the difference in mechanical impedance between the reinforcement 14 and the adhesive film 16. Indeed, it is known that the change in mechanical stiffness at the interface between two materials induces the reflection of a part of the incident compression wave into a traction wave.

Generally speaking, the compression stress can be made by a vibrating means or by a projectile projection means. Such a vibrating means is, for example, an ultrasonic hammering means. A projectile projection means is, for example, a blasting means.

In the preferred embodiment of the disclosure, the vibrating means is an ultrasonic hammering means. For this purpose, the stressing unit 40 comprises a chain of components aiming to produce the ultrasonic hammering.

These components comprise a generator 50, which converts a source of electrical energy for supplying the generator into a sinusoidal electrical signal. This signal supplies a converter 52, which converts the sinusoidal electrical signal into sinusoidal vibratory waves. These vibratory waves are transmitted to an amplifier 54, which amplifies them.

The amplifier 54 amplifies the vibratory waves to a sonotrode 56 which is adapted to mechanically transmit the vibratory waves. At one end of the sonotrode 56 there is at least one transmission finger 58, also called "indenter", which receives the vibratory waves from the sonotrode 56, which is arranged in contact with the reinforcement 14 of the second part, and which is adapted to transmit them mechanically to the reinforcement 14.

Depending on the power of the chain of components, it is possible, as is the case in FIGS. 3 and 4, to have several transmission fingers 58. These fingers 58 allow, for example, not only the leading edge of the reinforcement 14 to be ultrasonically hammered, but also, for example, the areas 26 and 28 where the reinforcement joins extrados areas 22 and 24 of the vane 12, in order to allow the adhesive film 16 to be uniformly separated.

The one or more transmission fingers 58 of the sonotrode 58 exert the mechanical stress by ultrasonic hammering, as mentioned above, substantially in the direction D substantially perpendicular to a surface of the adhesive film 16.

The ultrasonic hammering is performed, for example, at a frequency of between 10 kHz and 40 kHz.

As noted above, and as illustrated in FIGS. 3 and 4, the assembly 32 of the tooling 30 allows both the cooling and stressing steps to be performed simultaneously. These two operations are carried out in a coverage area C of the leading edge 20 of the vane 12 by the tooling 30, and more particularly by the fingers 58 of the sonotrode 56 immediately after passing the nozzle 48. The area C is of a length 1 less than the length L of the leading edge 14 of the vane 12. The tooling 40 is therefore moved along the entire length L of the leading edge 14 of the vane 12, as illustrated in FIGS. 3 and 4. During the movement, the cover area C is first cooled by the nozzle 48 and then immediately afterwards mechanically stressed by the transmission fingers 58. The close vicinity of the fingers 58 to the nozzle 48 prevents the leading edge 20 from heating up and losing its cooling effectiveness.

The separation of a vane reinforcement 14 from the vane 12 can therefore be carried out very simply by sweeping the latter with the tooling 30.

The disclosure simplifies and makes reliable such separating operations.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A separating method for separating a first mechanical part from a second mechanical part, wherein the second mechanical part is bonded to the first mechanical part by an adhesive film along a connecting area, the first mechanical part having a first specific thermal conductivity and the second mechanical part having a second thermal conductivity that is higher than the first thermal conductivity, the separating method comprising:
at least one cooling step during which a cooling fluid is projected only onto the second mechanical part so as to cool the second mechanical part to a negative temperature, the adhesive film being cooled by thermal conduction through the second mechanical part so that the adhesive film becomes brittle, and the first part being thermally insulated by the adhesive film, and
at least one stressing step during which the second mechanical part is subjected to a mechanical stress in order to cause the adhesive film to break.

2. The separating method according to claim 1, wherein the cooling and stressing steps are simultaneous.

3. The separating method according to claim 1, wherein, during the stressing step, the second part is subjected to a compressive stress in a direction substantially perpendicular to a surface of the adhesive film.

4. The separating method according to claim 3, wherein the compressive stress is carried out by a vibrating means or by a projectile projection means.

5. The separating method according to claim 4, wherein the vibrating means is an ultrasonic hammering means and wherein the projectile projection means is a blasting means.

6. The separating method according to claim 1, wherein the cooling fluid is liquid nitrogen.

7. The separating method according to claim 1, wherein the first part is a vane made of composite material, wherein the second part is a metal reinforcement bonded to a leading edge of said vane and wherein the separating method comprises two simultaneous steps comprising a step for cooling the metal reinforcement by projecting liquid nitrogen and a stressing step during which the reinforcement is subjected to a mechanical stress by ultrasonic hammering substantially in a direction substantially perpendicular to a surface of the adhesive film.

8. The separating method according to claim 7, wherein the two simultaneous steps are carried out by a tooling in an area of coverage of the leading edge of the vane by the tooling of a length less than a length of the leading edge of the vane, and wherein said tooling is moved along the entire length of the leading edge of the vane.

9. The separating method according to claim 7, wherein the liquid nitrogen is projected at a temperature of substantially −200° C. and wherein the ultrasonic hammering is performed at a frequency of between 10 kHz and 40 kHz.

10. A separating method for separating a first mechanical part from a second mechanical part, the method comprising:
obtaining an assembly comprising the second mechanical part bonded to the first mechanical part by an adhesive film along a connecting area, the first mechanical part having a first specific thermal conductivity and the second mechanical part having a second thermal conductivity that is higher than the first thermal conductivity;
cooling only the second mechanical part of the assembly to a negative temperature, the adhesive film being cooled by thermal conduction through the second mechanical part so that the adhesive film becomes brittle, and the first part being thermally insulated by the adhesive film; and
stressing the second mechanical part by subjecting the second mechanical part to a mechanical stress in order to cause the adhesive film to break.

11. The separating method according to claim 10, wherein the first mechanical part is a vane made of composite material, and wherein the second mechanical part is a metal reinforcement bonded to a leading edge of said vane.

12. The separating method according to claim 10, wherein said cooling only the second mechanical part of the assembly to a negative temperature and said stressing the second mechanical part by subjecting the second mechanical part to a mechanical stress occur simultaneously.

13. The separating method according to claim 12, wherein said cooling only the second mechanical part includes projecting liquid nitrogen, and wherein said stress includes ultrasonic hammering substantially in a direction substantially perpendicular to a surface of the adhesive film.

* * * * *

UNITED STATES PATENT AND TRADEMARK OFFICE
CERTIFICATE OF CORRECTION

PATENT NO. : 11,731,221 B2
APPLICATION NO. : 17/427321
DATED : August 22, 2023
INVENTOR(S) : V. Joudon et al.

Page 1 of 1

It is certified that error appears in the above-identified patent and that said Letters Patent is hereby corrected as shown below:

In the Claims

| Column | Line | |
|--------|------|---|
| 8 | 42 | "said stress" should read -- said stressing the second mechanical part by subjecting the second mechanical part to a mechanical stress --. |

Signed and Sealed this
Twenty-sixth Day of November, 2024

Katherine Kelly Vidal
*Director of the United States Patent and Trademark Office*